(12) United States Patent
MacFarlane

(10) Patent No.: US 10,975,726 B2
(45) Date of Patent: Apr. 13, 2021

(54) INTER-SHAFT BEARING ARRANGEMENT

(71) Applicant: PRATT & WHITNEY CANADA CORP., Longueuil (CA)

(72) Inventor: Ian A. MacFarlane, St-Bruno-de-Montarville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 16/247,609

(22) Filed: Jan. 15, 2019

(65) Prior Publication Data

US 2019/0145276 A1    May 16, 2019

Related U.S. Application Data

(62) Division of application No. 15/458,305, filed on Mar. 14, 2017, now Pat. No. 10,215,052.

(51) Int. Cl.
*F16C 19/26* (2006.01)
*F16C 27/04* (2006.01)
(Continued)

(52) U.S. Cl.
CPC .......... *F01D 25/16* (2013.01); *F01D 25/164* (2013.01); *F01D 25/18* (2013.01); *F16C 19/26* (2013.01); *F16C 27/045* (2013.01); *F16C 33/583* (2013.01); *F16C 33/6659* (2013.01); *F05D 2220/32* (2013.01); *F05D 2240/61* (2013.01); *F16C 2360/23* (2013.01)

(58) Field of Classification Search
CPC .......... F16C 19/06; F16C 19/26; F16C 23/08; F16C 27/045; F16C 33/6659; F16C 33/583; F16C 33/6603; F16C 2360/23; F16F 15/0237; F01D 25/164; F01D 25/16; F01D 25/18; Y10T 409/304312; Y10T 29/49645; F05D 2220/32; F05D 2240/61
USPC ......... 384/99, 451, 473, 535, 558, 581, 586, 384/584; 409/141; 310/90; 29/898
See application file for complete search history.

(56) References Cited

U.S. PATENT DOCUMENTS 2,548,975 A    4/1951   Hawthorne
2,955,424 A    10/1960  Hryniszak
(Continued)

FOREIGN PATENT DOCUMENTS

DE    3809976 A1 * 10/1988  .......... F16C 33/6622
EP    0103370        3/1984
(Continued)

OTHER PUBLICATIONS

A New Approach to Turboshaft Engine Growth, M. A. Compagnon, General Electric Company, Lynn, Massachusetts pp. 80-41-1 to 80-41-6, May 13, 1980.

*Primary Examiner* — Marcus Charles
(74) *Attorney, Agent, or Firm* — Norton Rose Fulbright Canada LLP

(57) ABSTRACT

A sleeve is provided for supplying lubricant to an inter-shaft bearing mounted between co-axially mounted inner and outer shafts of a gas turbine engine. The sleeve has a sleeve annular outer surface and a sleeve annular inner surface. At least one lubricant supply connecting member extends from the sleeve outer surface for connection to a lubricant supply. At least one sleeve channel fluidly links the sleeve annular inner surface to the lubricant supply connecting member.

6 Claims, 5 Drawing Sheets

(51) Int. Cl.
*F16C 33/58* (2006.01)
*F01D 25/16* (2006.01)
*F01D 25/18* (2006.01)
*F16C 33/66* (2006.01)

(56) References Cited

U.S. PATENT DOCUMENTS

| | | | |
|---|---|---|---|
| 3,698,777 A * | 10/1972 | McCoy | F16C 37/007 384/467 |
| RE30,210 E | 2/1980 | Buono et al. | |
| 4,213,661 A * | 7/1980 | Marmol | F16C 27/045 384/99 |
| 4,378,197 A | 3/1983 | Cattaneo et al. | |
| 4,400,098 A * | 8/1983 | Lacey | F16C 19/163 384/99 |
| 4,440,456 A | 4/1984 | Klusman | |
| 4,685,286 A | 8/1987 | Hetzer et al. | |
| 4,815,282 A | 3/1989 | Wilkinson et al. | |
| 4,971,457 A * | 11/1990 | Carlson | F01D 25/164 384/581 |
| 5,119,624 A | 6/1992 | McKenna | |
| 5,169,241 A * | 12/1992 | Singh | F01D 25/164 384/581 |
| 5,178,400 A * | 1/1993 | Singh | F01D 25/164 277/644 |
| 6,082,967 A | 7/2000 | Loisy | |
| 6,102,577 A | 8/2000 | Tremaine | |
| 6,735,954 B2 | 5/2004 | MacFarlane et al. | |
| 6,747,383 B2 * | 6/2004 | Tornquist | F16C 25/08 310/156.16 |
| 6,865,891 B2 | 3/2005 | Walsh et al. | |
| 6,895,741 B2 | 5/2005 | Rago et al. | |
| 6,901,759 B2 | 6/2005 | Frutschi | |
| 7,018,104 B2 * | 3/2006 | Dourlens | F16F 15/06 384/309 |
| 7,144,349 B2 | 12/2006 | Mitrovic | |
| 7,329,048 B2 | 2/2008 | Klusman et al. | |
| 7,500,365 B2 | 3/2009 | Suciu et al. | |
| 7,517,152 B1 * | 4/2009 | Walsh | F16C 23/08 384/99 |
| 7,574,854 B2 | 8/2009 | Moniz | |
| 7,628,542 B2 * | 12/2009 | Wada | F16F 15/0237 384/535 |
| 7,698,884 B2 | 4/2010 | Maguire et al. | |
| 7,758,302 B2 | 7/2010 | Linet et al. | |
| 8,209,952 B2 | 7/2012 | Ress, Jr. | |
| 8,350,398 B2 | 1/2013 | Butt | |
| 8,464,511 B1 | 6/2013 | Ribarov et al. | |
| 8,500,583 B2 | 8/2013 | Goi et al. | |
| 8,516,789 B2 | 8/2013 | Kupratis | |
| 8,621,871 B2 | 1/2014 | McCune et al. | |
| 8,845,245 B2 * | 9/2014 | Haas | B23Q 1/70 409/141 |
| 8,845,271 B2 * | 9/2014 | Woollenweber | F02C 6/12 415/107 |
| 9,062,611 B2 | 6/2015 | Sheridan | |
| 9,068,593 B2 | 6/2015 | Gloeckner et al. | |
| 9,297,305 B2 | 3/2016 | Drachsler et al. | |
| 9,341,121 B2 | 5/2016 | Kupratis | |
| 9,353,848 B2 | 5/2016 | Blewett et al. | |
| 9,366,295 B2 | 6/2016 | Sebald et al. | |
| 2013/0056982 A1 | 3/2013 | Gozdawa | |
| 2014/0126992 A1 | 5/2014 | Morreale et al. | |
| 2014/0130352 A1 | 5/2014 | Buldtmann et al. | |
| 2014/0250862 A1 | 9/2014 | Suciu et al. | |
| 2014/0252160 A1 | 9/2014 | Suciu et al. | |
| 2014/0260295 A1 | 9/2014 | Ullyott et al. | |
| 2014/0290265 A1 | 10/2014 | Ullyott et al. | |
| 2015/0369123 A1 | 12/2015 | Hanrahan | |
| 2016/0040554 A1 | 2/2016 | Hovhannisian et al. | |
| 2016/0363055 A1 | 12/2016 | Edwards | |

FOREIGN PATENT DOCUMENTS

| | | | |
|---|---|---|---|
| EP | 3095744 A1 * | 11/2016 | F16C 33/6659 |
| GB | 713839 | 8/1954 | |
| WO | 20150122948 | 8/2015 | |

* cited by examiner

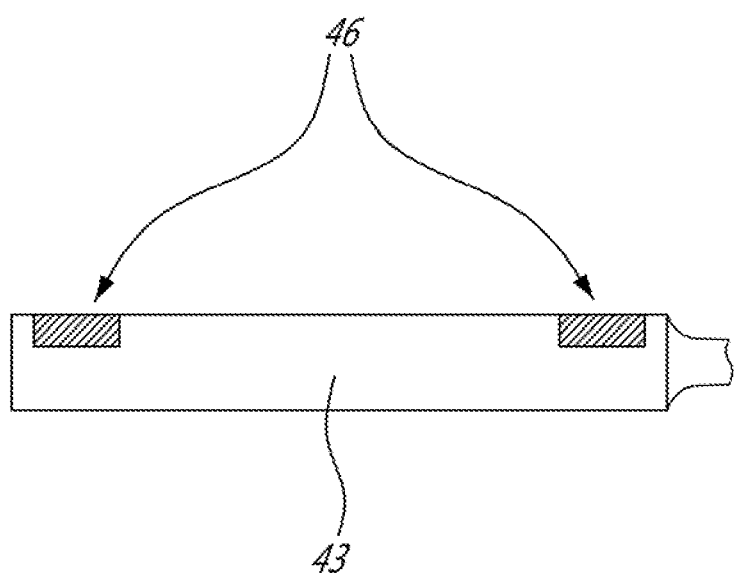

INTER-SHAFT BEARING ARRANGEMENT

CROSS-REFERENCE TO RELATED APPLICATIONS

The present application is a divisional of U.S. application Ser. No. 15/458,305, filed Mar. 14, 2017, now issued as U.S. Pat. No. 10, 2015,052 on Feb. 26, 2019, the content of which is being incorporated herein by reference.

TECHNICAL FIELD

The application relates generally to gas turbine engines and, more particularly, to bearings arrangements for co-axially mounted shafts.

BACKGROUND OF THE ART

Co-axially mounted shafts of gas turbine engines are known to include bearing assemblies in between. One such bearing assembly, known as damped bearing, comprises a thin (in the order of a few thousandths of an inch) annular area between a bearing race and a shaft, known as a damping annulus, which, when filled with lubricant, allows the bearing assembly to compensate for slight misalignments and to absorb small shaft vibrations during operation. Getting lubricant to the damping annulus, with the requisite fluid characteristics (such as pressure), is an ongoing challenge for gas turbine engine designers.

There is an ongoing need for novel inter-shaft damped bearing arrangements, more specifically for providing lubricant to the damping annulus area of such bearing arrangement.

SUMMARY

In one aspect, there is provided a gas turbine engine comprising: an inter-shaft bearing mounted radially between an inner shaft and a hollow outer shaft, the inner shaft being co-axially mounted inside the hollow outer shaft, the hollow outer shaft comprising a through-shaft passageway extending from an inner surface to an outer surface of such hollow outer shaft, a damping annulus located radially between an outer race of the inter-shaft bearing and an inner surface of the outer shaft, a sleeve, positioned circumferentially around the hollow outer shaft, and a lubricant buffer annulus located radially between the outer surface of the outer shaft and the sleeve; wherein the through-shaft passageway fluidly links the damping annulus with the lubricant buffer annulus and the sleeve defines a lubricant passage fluidly linking the lubricant buffer annulus to a lubricant supply.

In another aspect, there is provided a sleeve for supplying lubricant to an inter-shaft bearing mounted between a co-axially mounted inner and outer shaft of a gas turbine engine, wherein the sleeve comprises: a sleeve annular outer surface, a sleeve annular inner surface, at least one lubricant supply connecting member extending from the sleeve annular outer surface and adapted to be connected to a lubricant supply, and at least one sleeve channel fluidly linking the sleeve annular inner surface to the at least one lubricant supply connecting member.

In a further aspect, there is provided a method for providing oil to an inter-shaft bearing, mounted between an inner shaft co-axially mounted within a hollow outer shaft of a gas turbine engine, the inter-shaft bearing comprising a damping annulus located between an outer race of the inter-shaft bearing and an inner surface of the hollow outer shaft, the method comprising: providing an opening in the hollow outer shaft for fluidly linking the damping annulus with an outer surface of the outer shaft, and providing a static sleeve around the outer shaft for fluidly linking the outer surface of the outer shaft with a pressurised oil supply.

Further details of these and other aspects of the subject matter of this application will be apparent from the detailed description and drawings included below.

DESCRIPTION OF THE DRAWINGS

Reference is now made to the accompanying figures in which:

FIG. 5 is a side sectional view of an outer race of an inter-shaft bearing pursuant to an embodiment.

DETAILED DESCRIPTION

Figure 1:
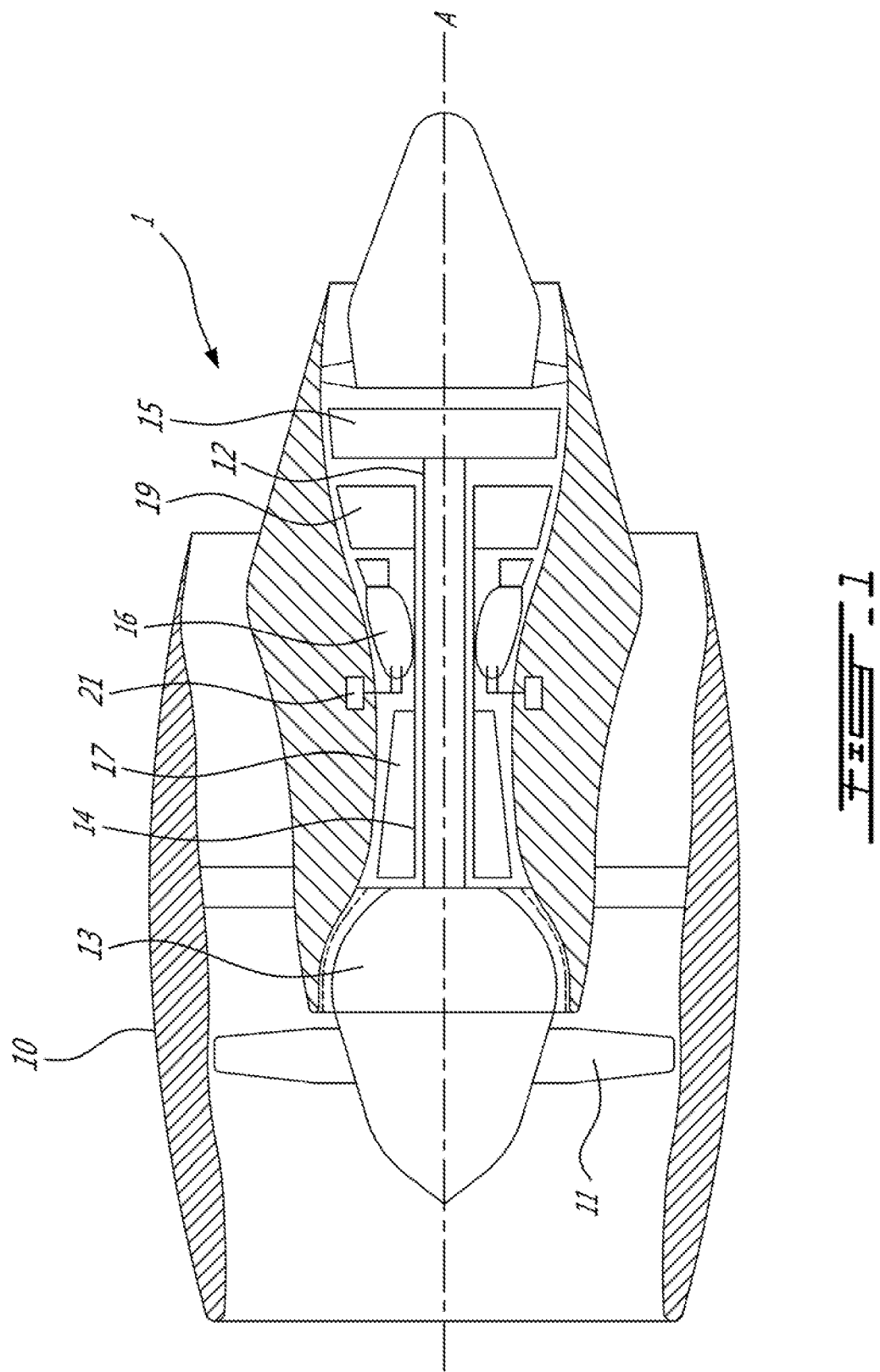
FIG. 1 is a schematic cross-sectional view of a gas turbine engine.

FIG. 1 illustrates an example of a turbofan gas turbine engine 1 generally comprising a housing or nacelle 10; a low pressure spool assembly 12 including a fan 11, a low pressure compressor 13 and a low pressure turbine 15; a high pressure spool assembly 14 including a high pressure compressor 17, and a high pressure turbine 19; and a combustor 16 including fuel injecting means 21. The low pressure spool assembly 12 and high pressure spool assembly 14 are concentrically mounted about engine centerline A; more specifically (as described and shown in more details below), engine 1 comprises 2 shafts co-axially (around engine centreline A) mounted within one another and a bearing assembly, known as an inter-shaft bearing assembly, mounted in between. Throughout this description, centerline A will be used to locate terms with inner and outer qualifiers; for example, inner and outer surface of an item will refer to the radially closer surface (inner) and the radially farther surface (outer) in relation to such centerline A.

Figure 2:
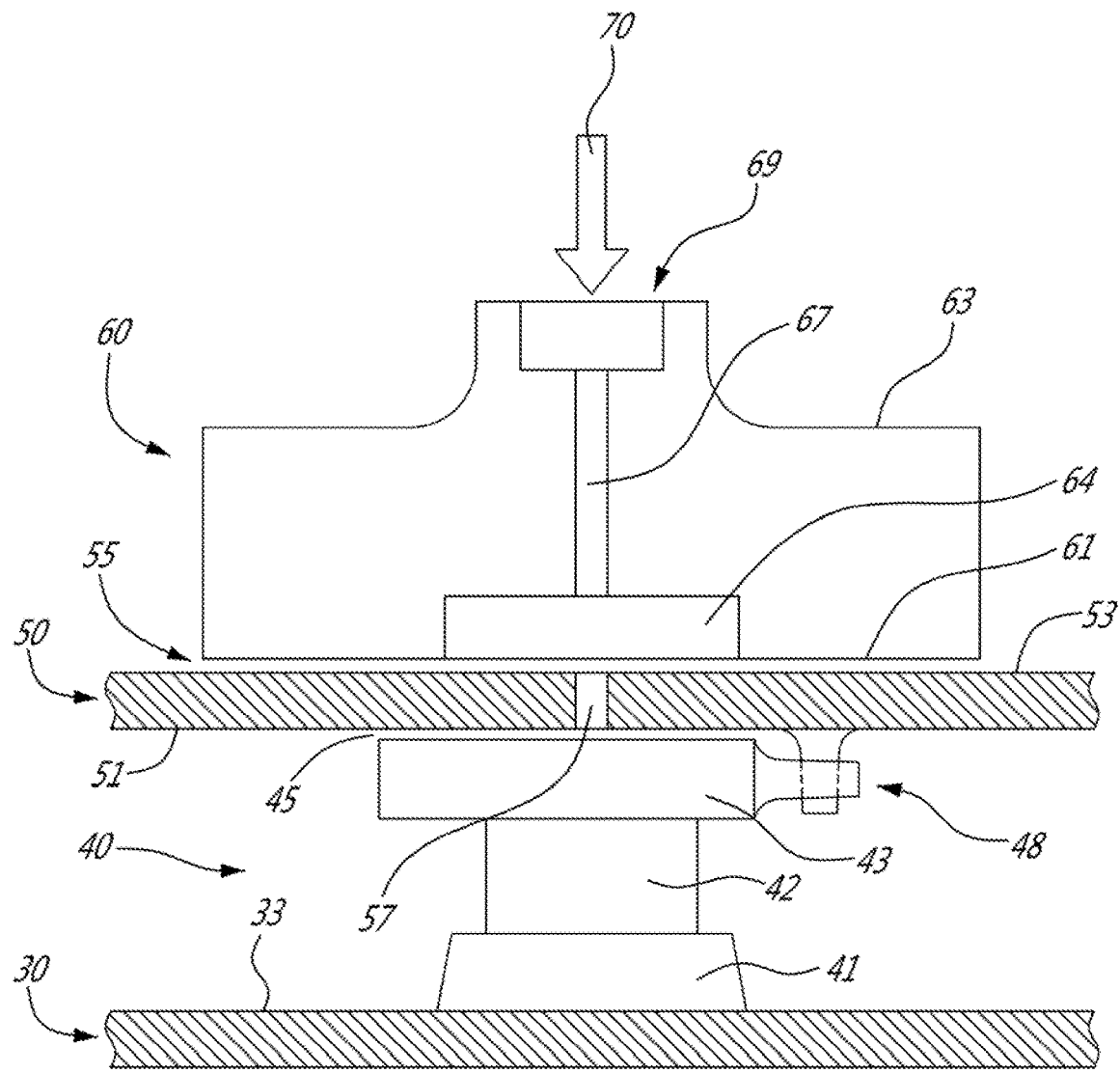
FIG. 2 is a side sectional view of an inter-shaft bearing arrangement pursuant to an embodiment.
Figure 3:
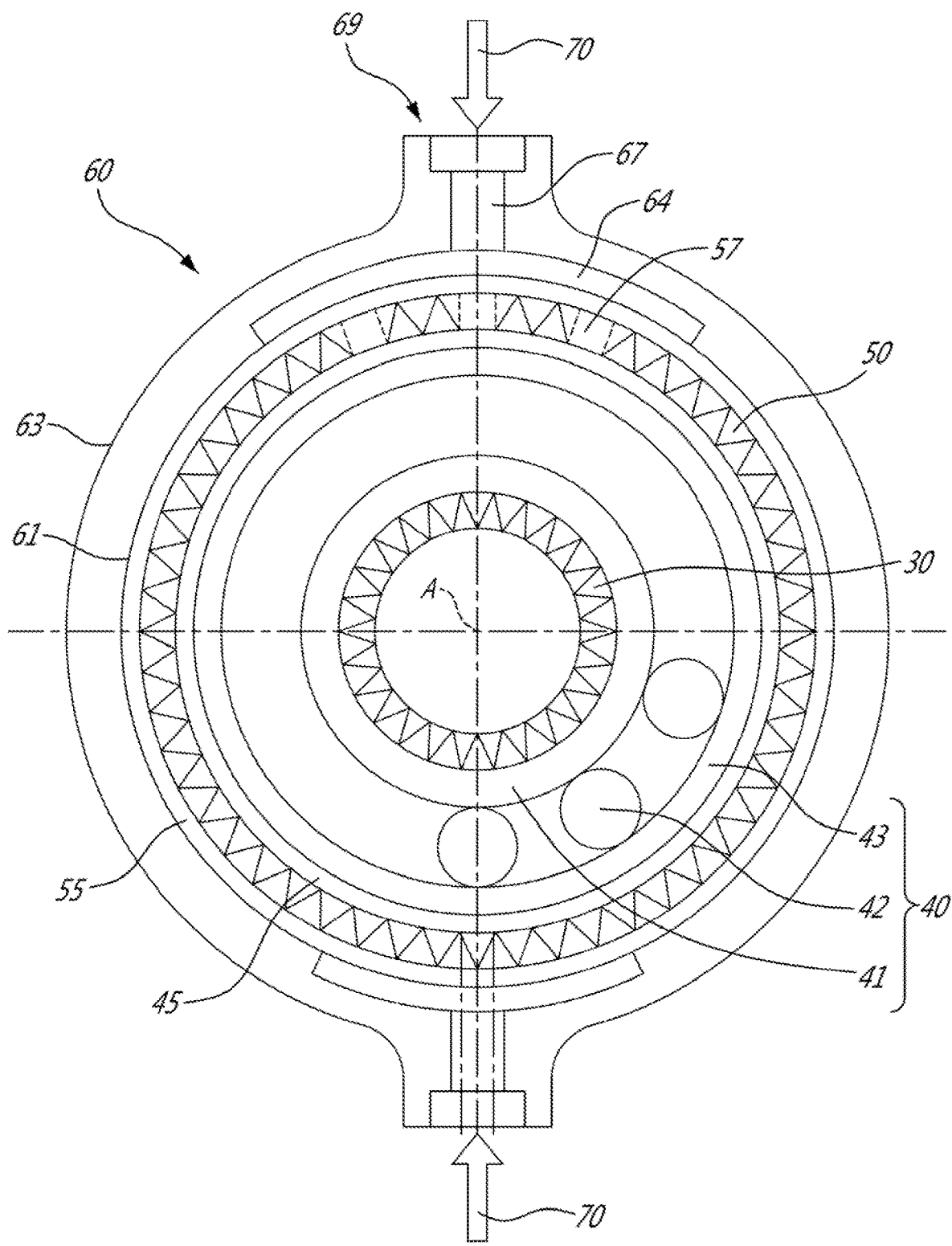
FIG. 3 is a front sectional view of an inter-shaft bearing arrangement pursuant to an embodiment.

As shown in FIGS. 2-3, inner shaft 30 and hollow outer shaft 50 are co-axially mounted within one another and rotate around centreline A during operation of engine 1. An inter-shaft bearing assembly 40 is mounted radially between inner shaft 30 and outer shaft 50. In the current embodiment, inter-shaft bearing assembly 40 is an inner diameter (ID) pilot type bearing, meaning that the primary bearing attachment occurs on its inner diameter (with its outer diameter being allowed some freedom of movement). More specifically, inner race 41 of inter-shaft bearing assembly 40 is secured, through a tight fit or other suitable means of attachment, to inner shaft 30, more specifically to inner shaft radially outer surface 33, so that, during operation, inner race 41 rotates with inner shaft 30. Outer race 43 is allowed some freedom of movement with respect to outer shaft radially inner surface 51, more specifically radial freedom of movement. In the current embodiment, outer race 43's attachment with respect to outer shaft radially inner surface 51 is accomplished through a male-female pin extension attachment arrangement 48, which allows outer race 43 some radial but no significant axial or circumferential freedom of movement with respect outer shaft 50; but any other type of suitable attachment, besides male-female pin extension attachment arrangement 48, is possible.

Inter-shaft bearing assembly 40 is a rolling-element bearing, but other bearing types, which benefit from lubricant contribution during operation, are possible pursuant. In the current embodiment, inter-shaft bearing assembly 40 is a roller bearing, meaning that the rolling elements placed between inner race 41 and outer race 43 are cylindrical rollers 42 (only a few of which are shown in FIG. 3 for ease of display). Other types of rolling-element bearing types, such as ball bearings (where the rolling elements placed between inner race 41 and outer race 43 are spherical balls), are possible.

Inter-shaft bearing assembly 40 is a damped bearing, meaning that there is a thin (in the order of a few thousandths of an inch) annular 45 between outer race 43 and outer shaft radially outer surface 53, such annular 45 being known as a damping annulus 45 because, when filled with lubricant during operation, it allows inter-shaft bearing assembly 40 to compensate for slight misalignments and to absorb small shaft vibrations.

Outer shaft 50 comprises a through-shaft passageway, in the current embodiment at least one hole 57 extending between outer shaft radially inner surface 51 and outer shaft radially outer surface 53, thereby fluidly linking damping annulus area 45 with outer shaft radially outer surface 53. It should be noted that the current embodiment discloses a plurality of holes 57 (more clearly shown in FIG. 3), as outer shaft 50 may have any suitable number of holes 57 as necessary to meet the relevant needs (to be described in more details below). Whereas the current embodiment shows holes 57 as substantially radial (i.e. the hole's centerline passes through centreline A), holes 57 may be angled (i.e. the hole's centerline does not pass through centreline A). Furthermore, holes 57 can be circumferentially equidistant from one another or not. Finally, whereas the current embodiment shows holes 57 as being axially aligned (i.e. are located on the same axial plane), holes 57 which are not so aligned, such as with a sieve-type configuration, is possible.

A sleeve 60 (shown by itself in FIG. 4) is positioned around outer shaft 50. Sleeve 60 is static, meaning that it does not rotate during operation. Sleeve 60 comprises an annular outer surface 63 and an annular inner surface 61. Sleeve 60 comprises a lubricant passage fluidly linked to a lubricant supply, in the current embodiment a sleeve channel 67, fluidly linked to a pressurised oil supply 70 (shown schematically in FIG. 2-3 by a double-arrow), extending through sleeve 60. Sleeve channel 67 is consequently fluidly linking pressurised oil supply 70 with an annular space between annular inner surface 61 and outer shaft radially outer surface 53, hereinafter defined as lubricant buffer annulus area 55. Sleeve channel 67 fluidly links pressurised oil supply 70 with lubricant buffer annulus area 55, via a lubricant supply connecting member 69 positioned on sleeve channel 67's outer extremity. Sleeve channel 67 and lubricant supply connecting member 69 are dimensioned to provide the necessary amount of lubricant (in the current embodiment pressurised oil) from the lubricant supply (in the current embodiment pressurised oil supply 70) to the lubricant buffer annulus area 55, to meet the relevant needs (as described below).

During operation, there is a need to provide lubricant, in the current embodiment oil, to damping annulus area 45 of inter-shaft bearing assembly 40. Such oil is provided to damping annulus area 45 from the at least one hole 57 which, in turn, originates from lubricant buffer annulus area 55 which, in turn, originates from the at least one sleeve channel 67 which, in turn, originates from pressurised oil supply 70. Oil supply 70 is pressurised because oil that is to be provided to damping annulus area 45 needs to have the requisite fluid characteristics (more specifically pressure characteristics) to address the issues, such as centrifugal force issues, that exist in the damping annulus area 45. It is however possible, to have an unpressurised lubricant supply connected to lubricant supply connecting member 69, as long as the other elements of this inter-shaft bearing arrangement contribute to ensure that the requisite fluid characteristics of the lubricant provided to damping annulus area 45 are met. For example, the quantity and characteristics (such as the angle of the hole's centerline and the hole's shape) of holes 57 may be such that, when rotating during operation, the requisite fluid characteristics of the lubricant provided to damping annulus area 45 is achieved. Characteristics of sleeve 60 will also factor into meeting the requisite fluid characteristics of the lubricant provided to damping annulus area 45. Indeed, although the current embodiment discloses 2 sleeve channels 67, sleeve 60 may have 1 or any suitable number of sleeve channels as necessary to meet the relevant needs. Furthermore, whereas the current embodiment shows sleeve channels 67 as substantially radial (i.e. the hole's centerline passes through centreline A), sleeve channels 67 may be angled (i.e. the hole's centerline does not pass through centreline A). Still furthermore, whereas the current embodiment shows sleeve channels 67 as being circumferentially equidistant from one another, sleeve channels 67 which do not have such equidistant characteristic is possible. Finally, whereas the current embodiment shows sleeve channels 67 as being axially aligned (i.e. are located on the same axial plane), sleeve channels 67 which are not so aligned is possible.

Figure 4:
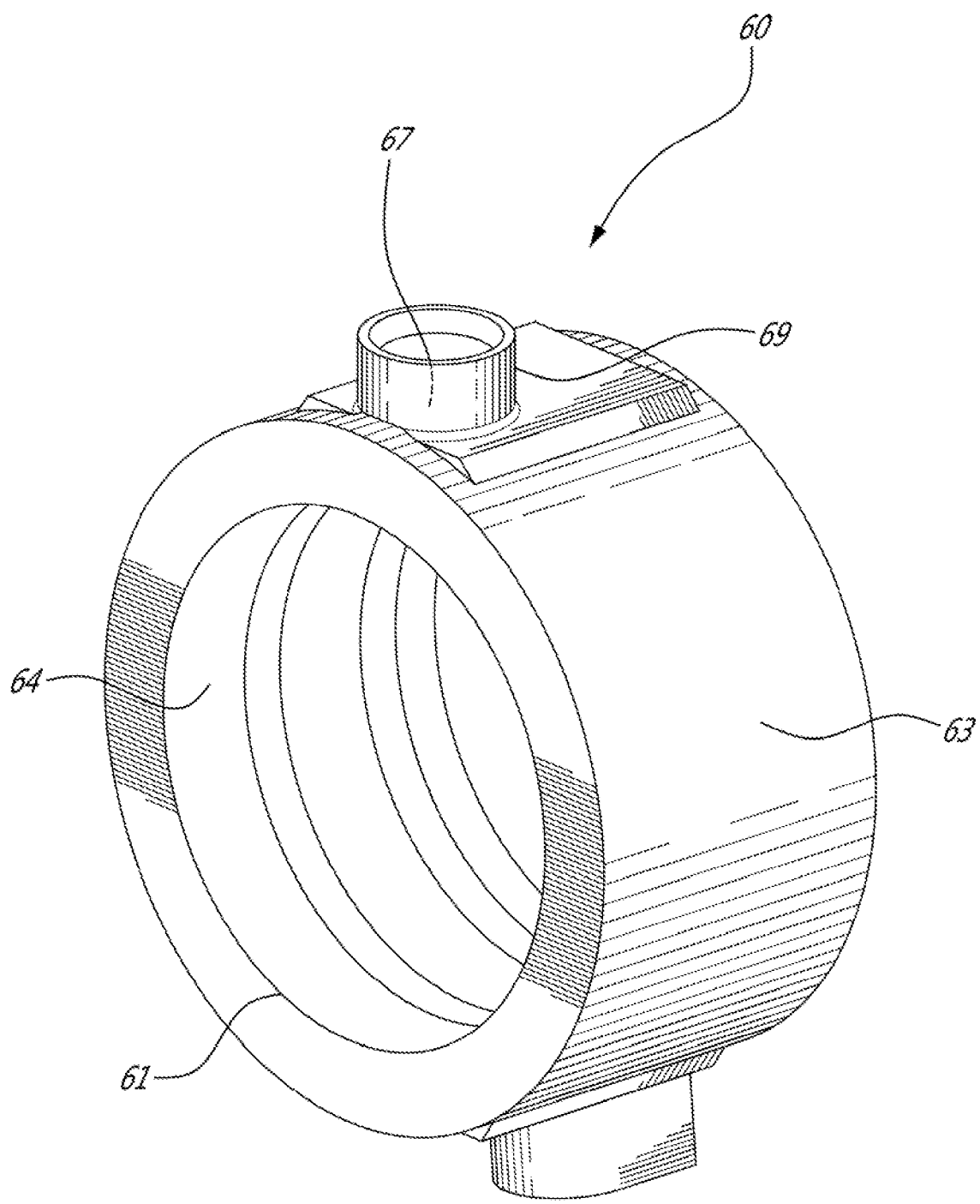
FIG. 4 is an isometric view of a sleeve pursuant to an embodiment.

Sleeve channel 67 fluidly links the lubricant supply with lubricant buffer annulus area 55. In circumstances where lubricant buffer annulus area 55 is not of a sufficient thickness to meet the requisite fluid characteristics of the lubricant provided to damping annulus area 45, a lubricant reserve area channel 64 can be added between sleeve annular inner surface 61 and sleeve channel 67. Lubricant reserve area channel 64 increases the area from which holes 57 can draw its lubricant and fluidly links damping annulus area 45 with the lubricant supply. As shown in FIG. 4, lubricant reserve area channel 64 may extend circumferentially around the whole sleeve annular inner surface 61. However, as shown in FIG. 3, lubricant reserve area channel 64 may only extend partially circumferentially around sleeve annular inner surface 61. Finally, whereas the current embodiment shows a single lubricant reserve area channel 64, it is possible to have (axially) side-by-side lubricant reserve area channels 64; in this latter case, sleeve channels 67 would have to be dimensioned and positioned to fluidly link pressurised oil supply 70 with each such lubricant reserve area channel 64.

As shown in FIG. 5, inter-shaft bearing assembly 40, more specifically outer race 43, may further include at least one bearing annular gasket 46 for reducing the amount of lubricant axially leaking from damping annulus area 45. In the current embodiment, a bearing annular gasket 46 is positioned at each axial extremity of outer race 43 so as to prevent lubricant axially leaking from both axial ends of damping annulus area 45. Annular gaskets 46 may be of the piston or o-ring variety.

Similarly, although not shown in any of the Figures, sleeve 60 may also include annular gaskets on its annular inner surface 61 for reducing the amount of lubricant axially leaking from lubricant buffer annulus area 55 and/or for reducing the amount of lubricant leaking from lubricant reserve area channel 64.

The above description is meant to be exemplary only, and one skilled in the art will recognize that changes may be made to the embodiments described without departing from the scope of the present disclosure. Still other modifications which fall within the scope of the present disclosure will be apparent to those skilled in the art, in light of a review of this disclosure, and such modifications are intended to fall within the appended claims.

The invention claimed is:

1. A shaft mounting arrangement comprising: an inner shaft and a hollow outer shaft co-axially mounted for rotation about an axis; an inter-shaft bearing mounted radially between the inner shaft and the hollow outer shaft; and a static sleeve positioned circumferentially around the hollow outer shaft, wherein the static sleeve includes:
   a sleeve annular outer surface,
   a sleeve annular inner surface, the sleeve annular inner surface being stationary and facing a rotating outer surface of the hollow outer shaft and defining therebetween a lubricant buffer annulus,
   at least one lubricant supply connecting member extending from the sleeve annular outer surface and adapted to be connected to a lubricant supply, and
   at least one sleeve channel fluidly linking the lubricant buffer annulus to the at least one lubricant supply connecting member.

2. The shaft mounting arrangement as defined in claim 1, further comprising at least one lubricant reserve channel defined in the sleeve annular inner surface, wherein the at least one sleeve channel fluidly links the at least one lubricant reserve channel to the at least one connecting member.

3. The shaft mounting arrangement as defined in claim 2, wherein the at least one lubricant reserve channel extends around the full circumference of the sleeve annular inner surface.

4. A method for providing oil to an inter-shaft bearing mounted radially between an inner shaft co-axially mounted within a hollow outer shaft of a gas turbine engine, the inter-shaft bearing comprising a damping annulus located between an outer race of the inter-shaft bearing and an inner surface of the hollow outer shaft, the method comprising:
   providing an opening in the hollow outer shaft for fluidly linking the damping annulus with an outer surface of the outer shaft, and
   providing a static sleeve around the outer shaft for fluidly linking the outer surface of the outer shaft with a pressurised oil supply.

5. A method for providing lubricant to an inter-shaft bearing as defined in claim 4, further comprising providing a lubricant reserve channel within the sleeve for fluidly linking the outer surface of the outer shaft to the pressurised oil supply.

6. A method for providing lubricant to an inter-shaft bearing as defined in claim 5, further comprising providing a lubricant supply connecting member, extending from the sleeve, for fluidly linking the lubricant reserve channel to the pressurised oil supply.

* * * * *